United States Patent
Hessenbruch

(10) Patent No.: US 7,347,680 B2
(45) Date of Patent: Mar. 25, 2008

(54) DEVICE FOR PRODUCING LAY-FLAT TUBES IN BLOWN FILM EXTRUSION INSTALLATION

(75) Inventor: Rolf Hessenbruch, Remscheid (DE)

(73) Assignee: Kiefel Extrusion GmbH, Worms (DE)

( * ) Notice: Subject to any disclaimer, the term of this patent is extended or adjusted under 35 U.S.C. 154(b) by 225 days.

(21) Appl. No.: 10/987,797

(22) Filed: Nov. 12, 2004

(65) Prior Publication Data

US 2005/0112227 A1    May 26, 2005

(30) Foreign Application Priority Data

Nov. 13, 2003    (DE) ................................ 103 52 976

(51) Int. Cl.
*B28B 5/00*    (2006.01)
(52) U.S. Cl. ................... 425/72.1; 425/326.1; 425/377
(58) Field of Classification Search ............. 425/326.1, 425/377, 388, 392, 72.1
See application file for complete search history.

(56) References Cited

U.S. PATENT DOCUMENTS

2005/0056973 A1 * 3/2005 Ooyama et al. ............ 264/510

FOREIGN PATENT DOCUMENTS

| DE | 85 34 072 | 4/1987 |
|---|---|---|
| DE | 102 10 845 | 4/2003 |
| DE | 10 2004 038 165 | 4/2005 |

* cited by examiner

*Primary Examiner*—Yogendra N. Gupta
*Assistant Examiner*—Maria Veronica Ewald
(74) *Attorney, Agent, or Firm*—Cohen Pontani Liebermen & Pavane LLP

(57) ABSTRACT

A lay-flat device of a blown film extrusion installation includes brush rollers in the upper half entirely or partly. The brush rollers include bristles which are directed obliquely outwards and which, on contact with an extruded film tube, exert a slight spreading force on the film, by which folding is avoided.

7 Claims, 4 Drawing Sheets

DEVICE FOR PRODUCING LAY-FLAT TUBES IN BLOWN FILM EXTRUSION INSTALLATION

BACKGROUND OF THE INVENTION

1. Field of the Invention

The invention relates to a blown film extrusion installation for producing blown tubular plastic films.

2. Description of the Related Art

In blown film extrusion installations, a film tube is extruded from a round die, drawn off and thereby cooled and subsequently transformed from the round state into the laid-flat state by a lay-flat device. The lay-flat device may comprise fixed boards or co-rotating rollers or brush rollers. These laying-flat devices present no operational problems when the films being produced are of normal elasticity. However, when rigid films are produced and/or when there is low internal film pressure, folds may form which are difficult to eliminate because there are no suitable devices available for this. Spreading devices have been used inside the blown tubular film, but have not become widely adopted because they are too difficult to handle.

SUMMARY OF THE INVENTION

An object of the present invention is to provide a lay-flat device for a blown film extrusion installation which prevents the above-described disadvantages of the prior art. It is known that, when laying the film tube flat, the geometrical conditions cause different lengths to occur between the central region and the lateral region, which may lead to folding. Folds may be avoided by applying a transverse force to the film during the laying-flat operation, so that film is pulled out transversely to prevent folds from forming.

The object of the present invention is met by providing a lay-flat device in a blown film extrusion installation having rotating brush rollers which cause transverse or spreading forces to act on the film during the rotation of the brush rollers. According to the present invention, the rotating brush rollers are arranged in the upper region of the lay-flat device with oblique bristles directed outwards from the center. Even when there is slight contact, the oblique bristles exert a slight transverse force on the film which tends to eliminate the formation of folds.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
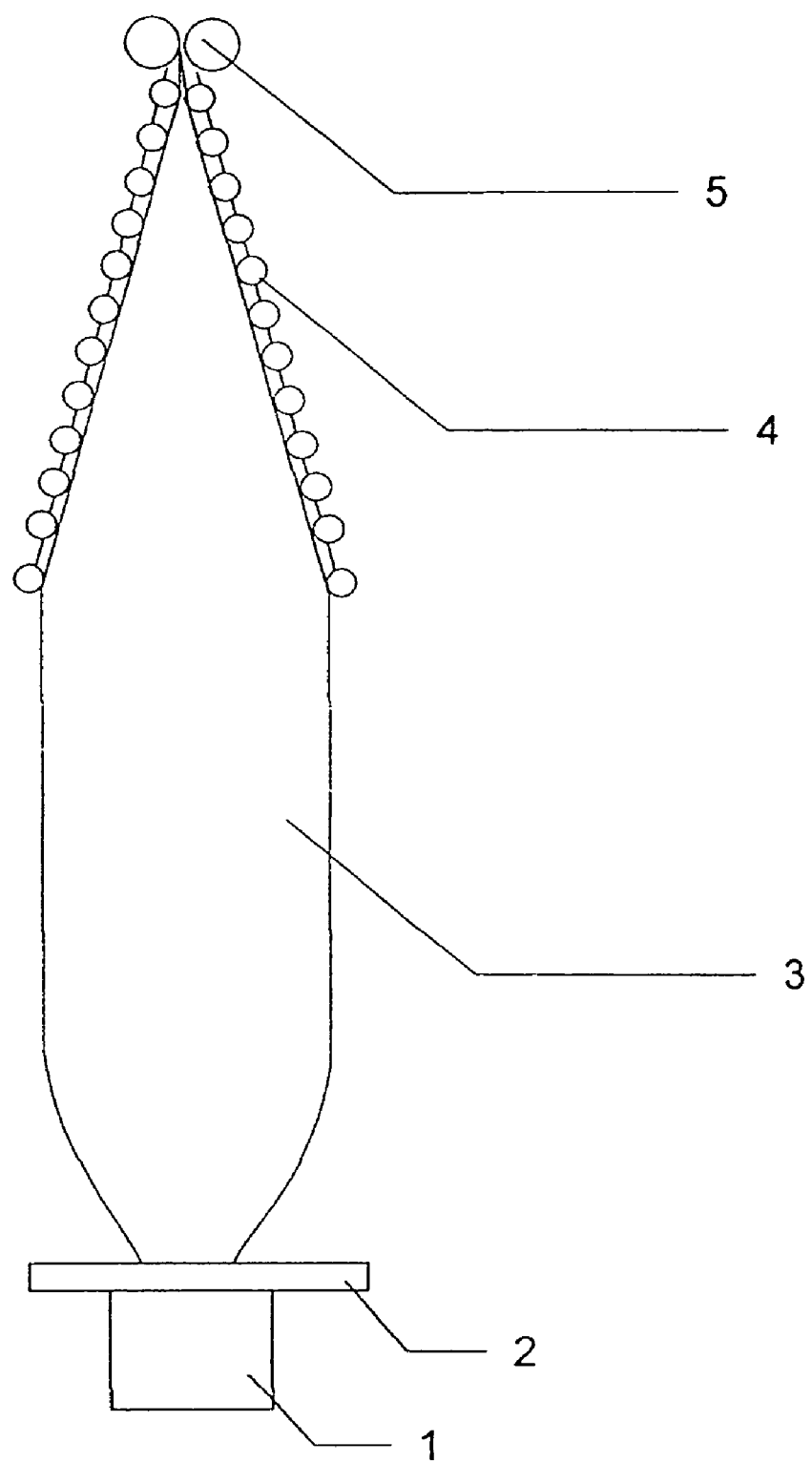
FIG. 1 is a schematic diagram showing a prior art blown film extrusion installation.

FIG. 1 shows a prior art blown film installation with a blowing head 1 and an air cooling ring 2. Melt is extruded through a die in a blowing head 1 to form a round tube 3 which is cooled by the cooling ring 2. The round film tube 3 is laid flat by rollers in the lay-flat device 4. The installation further includes draw-off rollers 5 to draw the tube 3 off of the lay-flat device 4.

Figure 2:
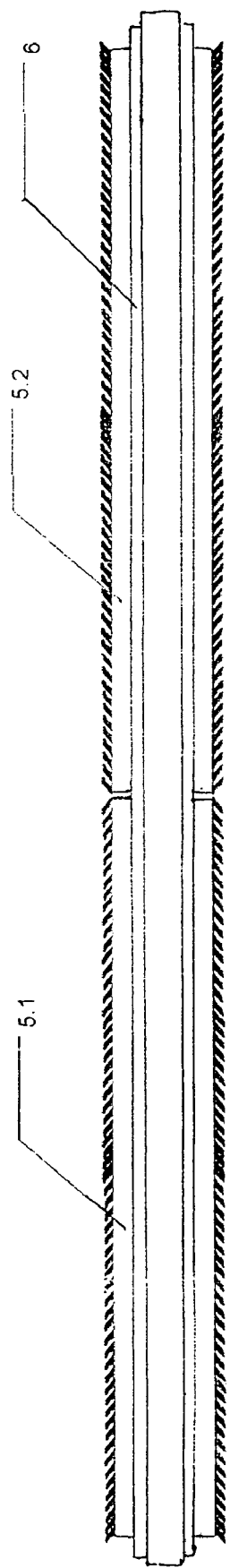
FIG. 2 is a longitudinal sectional view of an embodiment of a brush roller with outwardly directed bristles.

FIG. 2 shows a brush roller 6 having outwardly directed bristles 5.1 and 5.2 which may be used in the lay-flat device 4. The spreading effect is produced by the bristles 5.1 and 5.2 deflecting outwards when there is slight contact between the bristles 5.1 and 5.2 and the film tube 3, thereby producing an outward movement. This outward movement leads to an adequate transverse force on the film for avoiding folds.

Figure 3:
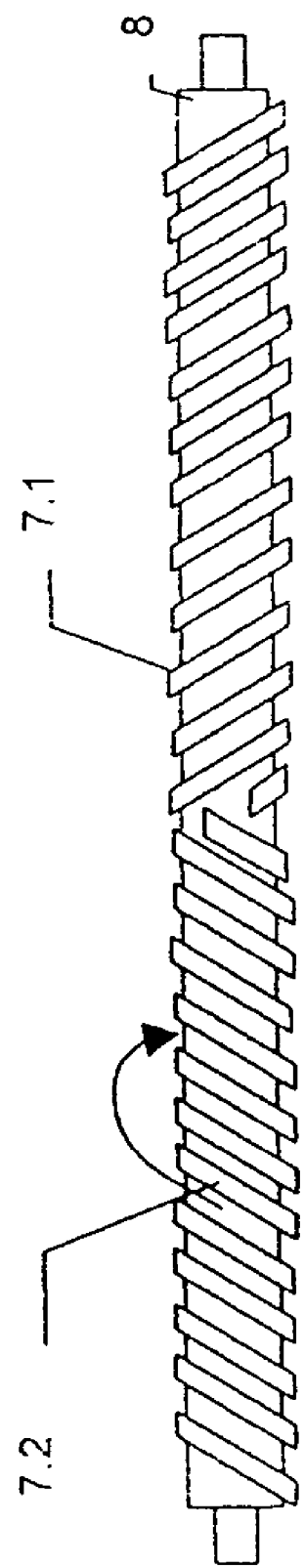
FIG. 3 is a longitudinal sectional view of a further embodiment of a brush roller with oblique bristles and spirally arranged bristles.

FIG. 3 shows another brush roller 8 having bristles 7.1 and 7.2 which are likewise outwardly directed. The bristles 7.1 and 7.2 are additionally arranged spirally, and consequently exert a greater spreading effect outwards on the film during a rotational movement.

Figure 4:
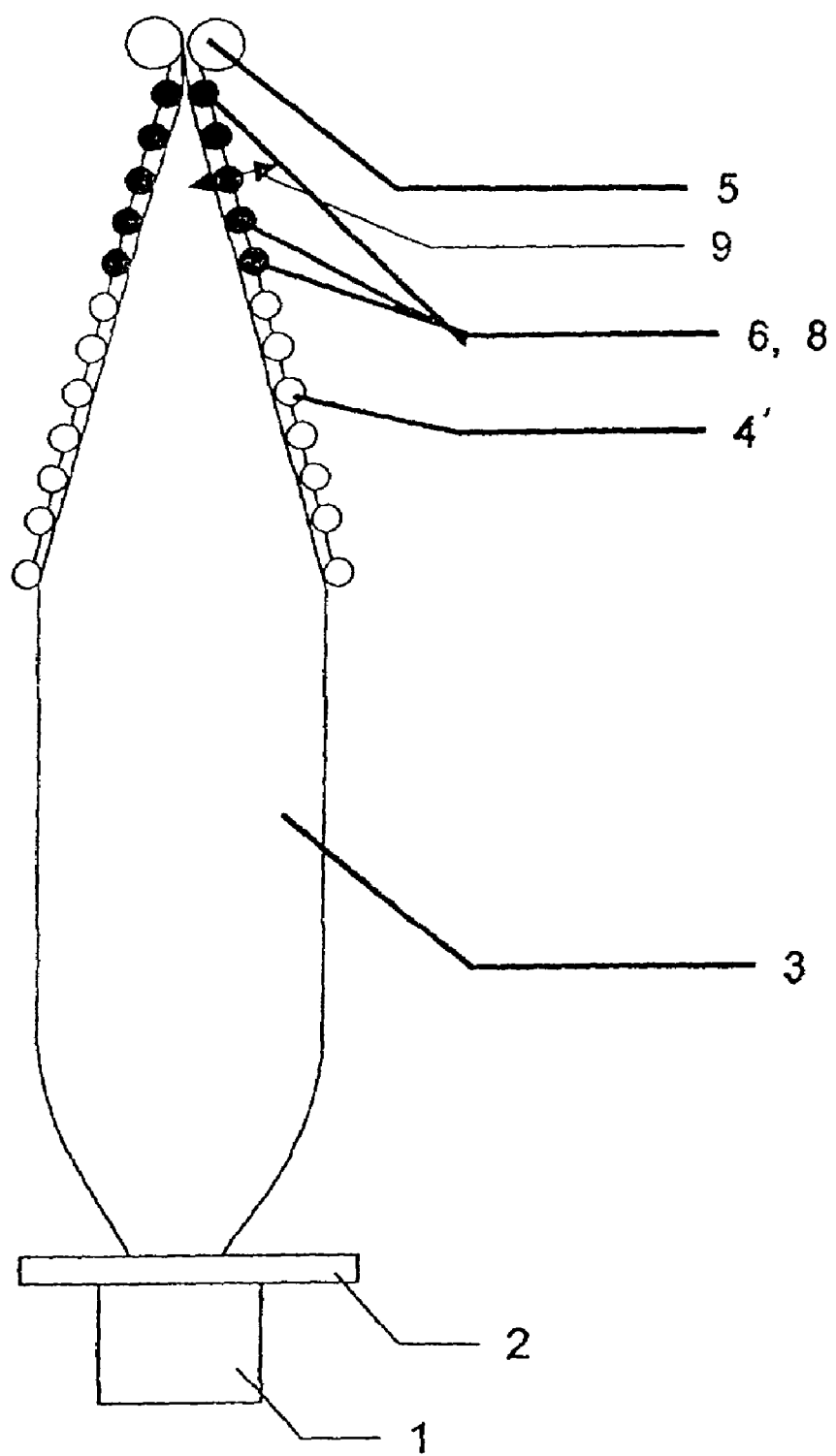
FIG. 4 is a schematic diagram of a blown film installation with the spreading rollers in the upper part of the lay-flat device according to the present invention.

FIG. 4 schematically shows a blown film installation in which the brush rollers 6 and/or 8 with the spreading effect are installed in the upper region in the lay-flat device 4'. In this case, it is of particular significance that the uppermost roller is formed as a spreading roller 6 or 8. The spreading rollers 6 or 8 arranged under it enhance the effect. However, the spreading rollers 6 or 8 are not necessary in the lower half of the lay-flat device 4. Since the effect of the spreading also depends on the contact area, it is expedient to arrange the spreading rollers 6 or 8 so that they are displaceable in a direction 9, approximately normal to the surface of the lay-flat film tube 3, so that the spreading rollers 6 or 8 can be pressed against the film tube 3 to a greater or lesser extent.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A lay-flat device in a blown film extrusion installation, comprising at least one of boards and rollers operatively arranged for flattening an extruded tube of blown film that is drawn through a longitudinal path of the lay-flat device, and further comprising a spreading roller, wherein the spreading roller is a brush roller having obliquely directed bristles and arranged in an upper region of the lay-flat device, said bristles extending from said brush roller such that said bristles are obliquely directed from a longitudinal center of said brush roller toward the sides of said brush roller, said bristles being arranged and dimensioned for producing a transverse outward spreading effect on the blown film during contact between the blown film and said bristles.

2. The lay-flat device of claim 1, wherein said spreading roller comprises at least an uppermost roller of said rollers in said lay-flat device.

3. The lay-flat device of claim 1, further comprising a plurality of said spreading rollers in an upper half of said lay-flat device.

4. The lay-flat device of claim 1, wherein said bristles are spirally arranged on said spreading roller.

5. The lay-flat device of claim 1, wherein said spreading roller is individually displaceable approximately normal to a longitudinal direction of a section of the blown film contacting said spreading roller.

6. The lay-flat device of claim 2, wherein bristles are spirally arranged on said spreading roller.

7. The lay-flat device of claim 3, wherein each of said spreading rollers is individually displaceable approximately normal to a longitudinal direction of a section of the blown film contacting said each of said spreading rollers.

* * * * *